United States Patent
Lidström et al.

(10) Patent No.: US 9,277,029 B2
(45) Date of Patent: Mar. 1, 2016

(54) METHOD AND APPARATUS FOR PROVIDING RELEVANT SERVICE LEVELS

(75) Inventors: Mattias Lidström, Stockholm (SE); Ignacio Mas Ivars, Tullinge (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 171 days.

(21) Appl. No.: 13/260,538

(22) PCT Filed: Mar. 27, 2009

(86) PCT No.: PCT/SE2009/050325
§ 371 (c)(1),
(2), (4) Date: Sep. 26, 2011

(87) PCT Pub. No.: WO2010/110710
PCT Pub. Date: Sep. 30, 2010

(65) Prior Publication Data
US 2012/0030365 A1    Feb. 2, 2012

(51) Int. Cl.
*H04L 29/06* (2006.01)
*G06F 15/16* (2006.01)
*H04L 29/08* (2006.01)

(52) U.S. Cl.
CPC .............. *H04L 67/322* (2013.01); *H04L 65/80* (2013.01); *H04L 65/1016* (2013.01); *H04L 67/104* (2013.01)

(58) Field of Classification Search
CPC .... H04L 65/1016; H04L 65/80; H04L 67/104
USPC ........................................................... 709/228
See application file for complete search history.

(56) References Cited

U.S. PATENT DOCUMENTS 6,598,034 B1 * 7/2003 Kloth ............................... 706/47
6,804,717 B1 * 10/2004 Bakshi et al. ................. 709/225
(Continued)

FOREIGN PATENT DOCUMENTS

EP    1633093 A1    3/2006

*Primary Examiner* — Kevin Bates
*Assistant Examiner* — Nazia Naoreen
(74) *Attorney, Agent, or Firm* — Coats & Bennett, P.L.L.C.

(57) ABSTRACT

Method and apparatus in a router (200) of an IP network, for providing a relevant and expected service level for a first subscriber (A) in a peer-to-peer session with a second subscriber (B). When a session setup message (PATH) sent from the first subscriber is received (2:2) at the router, a required service level is detected from a service level indicator in the received message, and a service level definition of an operator of the first subscriber is obtained (2:3) for interpreting the service level indicator. Communication resources required for data transmission during the session are determined (2:4) according to the detected service level as interpreted by the service level definition. The determined communication resources are then booked (2:4) in the router, and the session setup message is forwarded (2:7) to a next hop node in the transmission path towards the second subscriber.

20 Claims, 3 Drawing Sheets

(56) References Cited

U.S. PATENT DOCUMENTS

| | | | |
|---|---|---|---|
| 7,068,654 B1* | 6/2006 | Joseph et al. | 370/392 |
| 7,643,414 B1* | 1/2010 | Minhazuddin | 370/230 |
| 7,733,872 B2* | 6/2010 | Hewett | H04L 12/5695 370/395.3 |
| 8,189,596 B2* | 5/2012 | Rasanen | 370/395.21 |
| 8,233,487 B2* | 7/2012 | Kusama et al. | 709/227 |
| 8,271,674 B2* | 9/2012 | Takacs et al. | 709/231 |
| 8,572,258 B2* | 10/2013 | Castellanos Zamora et al. | 709/227 |
| 2004/0165587 A1 | 8/2004 | Kiyoto et al. | |
| 2006/0294112 A1* | 12/2006 | Mandato et al. | 707/100 |
| 2007/0091898 A1* | 4/2007 | Rengaraju | H04L 29/06027 370/395.21 |
| 2012/0008632 A1* | 1/2012 | Liu et al. | 370/395.5 |

* cited by examiner

METHOD AND APPARATUS FOR PROVIDING RELEVANT SERVICE LEVELS

TECHNICAL FIELD

The present invention relates generally to a method and arrangement for providing relevant service levels for subscribers during peer-to-peer sessions by controlling communication resources in routers, such that quality expectations of subscribers can be met.

BACKGROUND

Various multimedia services have been developed for packet-based communication using IP (Internet Protocol), typically involving transmission of media in different formats and combinations between user terminals such as fixed or mobile computers and telephones. An architecture called "IP Multimedia Subsystem" (IMS) has also been developed to enable such multimedia services and sessions for user terminals connected to different access networks.

Multimedia sessions are handled by specific session control nodes in the IMS network typically using the signalling protocol "SIP" (Session Initiation Protocol) for setup of the sessions. For example, a terminal may send a message called "SIP INVITE" to initiate a session with another terminal or a server, e.g. when a multimedia application has been invoked in the terminal. The SIP INVITE message triggers different actions in the IMS network and the access network for establishing the session, including reservation of appropriate resources in the access network used.

In SIP, an additional protocol called "SDP" (Session Description Protocol) is used for specifying various parameters of a multimedia session, and an SDP message is typically embedded as a self-contained body within SIP messages. SDP messages are used to provide information on terminal capabilities and media properties, in order to specify and negotiate session parameters for multimedia sessions, which is well-known in the art. The session parameters may include terminal capabilities, media properties and address information necessary to establish a session. The above-mentioned SIP INVITE message and a common response message "SIP 200 OK" typically include the embedded SDP message with session parameters proposed by the sender for the session.

A policy node associated with the used access network is also typically connected to the IMS network. Among other things, the policy node controls the reservation of network resources for the sessions, based on various predetermined policies and subscription profiles. In particular, different QoS (Quality of Service) requirements can be enforced by the policy node for different services and/or subscribers for the above resource reservation in the access network, e.g. based on the SDP negotiation above. In multimedia sessions controlled by an IMS network, a desired or expected QoS can be obtained for the participating parties when the policy node controls the reservation of network resources as described above.

When establishing a communication session for a subscriber, various network resources are thus reserved preferably such that an acceptable and expected level of service is maintained for the subscriber, e.g. with respect to data bitrates and latency. When reserving network resources during setup of an IMS-controlled session, any QoS requirements can thus be taken into account.

However, sessions initiated and controlled solely by the participating parties without involving any intermediate session control node or policy node, generally referred to as peer-to-peer sessions, cannot obtain a specific QoS in the manner above. Any data transmitted as data packets between the parties are routed through an IP network, e.g. the Internet, over various routers each having its own mechanisms and policies for controlling different data flows. There is no standardised or consistent mechanism today for ensuring that QoS requirements of the communicating parties are taken into account in the routers. In FIG. 1, a typical scenario is shown for a peer-to-peer session between two user terminals A and B over routers R in an IP network 100. Terminal A is connected to an access router $R_A$ and terminal B is connected to another access router $R_B$. The transmission path over multiple intermediate routers R in the network 100 may vary for different data packets during the session, which is well-known in the art.

Today, differentiated services and subscriptions are commonly offered to subscribers of an IMS network such that they can consume services with different subscription types that typically dictate the QoS requirements for those services. The subscribers may thus be offered specific service levels with respect to QoS, e.g. for different subscription types and also for individual services. For example, using common terminology, a "Platinum" subscription may provide a relatively high warranted QoS or service level, whereas "Gold", "Silver" and "Bronze" subscriptions provide successively lower service levels.

Moreover, specific services may also be offered with different service levels, e.g. at different prices. This differentiation of subscriptions, services and quality/service levels becomes increasingly significant and will thus influence the customer satisfaction and expectations to a great extent. For example, a Bronze subscriber might be satisfied to obtain a certain service level whereas a Platinum subscriber might not, expecting a higher service level.

However, such service levels cannot be guaranteed for peer-to-peer sessions as explained above. Furthermore, when SIP is used to initiate a peer-to-peer session, there is no way to map service level requirements between different operator networks which may have their own definitions of service levels. For example, the commonly used terms Bronze, Silver, Gold and Platinum for different service levels may have different implications in different operator networks with respect to quality related session parameters. Moreover, the sessions need to be symmetrical in terms of using the same quality related session parameters in both directions, in order to achieve a properly working SDP negotiation. Thus, it is a problem that a desired and relevant service level cannot normally be accomplished for peer-to-peer sessions over routers in an IP network not centrally managed, such as the Internet.

SUMMARY

It is an object of the invention to address the problems outlined above. In particular, it is an object to enable subscribers to consume communication services with a service level or QoS that is relevant or justified, when involved in peer-to-peer sessions. These objects and others can be obtained by providing a method and an arrangement according to the independent claims attached below.

According to one aspect, the invention involves a method in a router of an IP network, for providing a relevant service level for a first subscriber in a peer-to-peer session with a second subscriber. In the method, when a session setup message sent from the first subscriber is received, a required service level of the first subscriber is detected from a service level indicator included in the session setup message. A service level definition of an operator of the first subscriber is then obtained, and communication resources, required in the router for data transmission from the second subscriber to the first subscriber according to the detected service level of the first subscriber, are determined as interpreted by means of the service level definition. The determined communication resources are then booked in the router, and the session setup message is forwarded to a next hop node.

According to another aspect, the invention involves an apparatus in a router of an IP network, for providing a relevant service level according to the method above. The router apparatus comprises a receiving unit adapted to receive a session setup message sent from the first subscriber, and to detect a required service level of the first subscriber from a service level indicator included in the session setup message. The apparatus also comprises an obtaining unit adapted to obtain a service level definition of an operator of the first subscriber, and a resource manager adapted to determine communication resources required in the router for data transmission from the second subscriber to the first subscriber according to the detected service level as interpreted by means of the service level definition. The resource manager is further adapted to book the communication resources in the router. The apparatus also comprises a forwarding unit adapted to forward the session setup message to a next hop node.

The invented method and apparatus in the router may be implemented according to any of the following optional embodiments.

In one embodiment, the resource manager is further adapted to record in the router a last hop node that has forwarded the session setup message to the router, for further use to ensure that any session-related messages and data packets transmitted in the opposite direction are routed over the same path as the session setup message. The session setup message may comprise parameters mapped from a preceding SDP negotiation.

In further embodiments, the session setup message from the first subscriber may be a resource booking message, and the resource manager may be further adapted to reserve the booked communication resources in the router upon receiving a booking confirmation message sent from the second subscriber. The resource booking message may be a PATH message and the booking confirmation message may be a RESV message.

The obtaining unit may be further adapted to fetch the service level definition from a QoS control server of the operator of the first subscriber, based on a URI in the received session setup message. The service level definition may be specified in an XML document maintained at the QoS control server. The obtaining unit may be further adapted to retrieve the service level definition from a local storage in the router.

According to another aspect, the invention also involves an apparatus in a user terminal for obtaining a relevant service level in a peer-to-peer session with a second subscriber. The terminal apparatus comprises an obtaining unit adapted to obtain a URI referring to a service level definition maintained by a QoS control server of an operator of the first subscriber. The terminal apparatus further comprises a sending unit adapted to send a session setup message to the second subscriber over a transmission path comprising at least one router, the session setup message comprising the URI and a service level indicator referring to a required service level of the first subscriber.

Further features of the invention and its benefits will be explained in the detailed description below.

BRIEF DESCRIPTION OF THE DRAWINGS

The invention will now be described in more detail by means of preferred embodiments and with reference to the accompanying drawings, in which.

DETAILED DESCRIPTION

The invention enables peer-to-peer sessions between subscribers over routers in a transmission path of an IP network, where communication resources can be reserved asymmetrically in the routers according to different service levels that are expected or required by the subscribers. Thereby, each participating subscriber is able to receive data or media from the opposite subscriber during the session according to an expected service level as relevant to the receiving subscriber.

Briefly described, the required service levels are indicated in session setup messages, e.g. comprising SDP messages, exchanged between the subscribers during a session setup procedure. Thereby, each router in the transmission path of the session can detect a service level indication in a session setup message sent by a subscriber, and reserve communication resources in the router accordingly in the receive direction for that subscriber. Thus, a regular SDP message or other session setup message can be utilised for providing the service level indication, in the manner described below.

The service level indications in the session setup messages can be interpreted by means of definitions made by different operators. In one embodiment, a service level definition of an operator is already stored or cached in the routers. In another embodiment, the operator's service level definition is fetched from a QoS control server of that operator using a URI (Universal Resource Identifier) that the sending subscriber includes in the session setup message. In practice, the subscriber will preferably always include the URI along with the service level indication in a session setup message sent towards the opposite subscriber, thereby enabling the routers to fetch the service level definition from the QoS control server if necessary. That session setup message is then transmitted over the routers in the transmission path such that each router can read the service level indication and also URI if necessary, and reserve communication resources accordingly.

In the following exemplary embodiments and throughout the description, the term "subscriber" generally represents an end-user and his/her communication equipment used when establishing and executing services in the manner described herein, e.g. by means of a UA (User Agent) or the like implemented in a user terminal. The communication equipment of the subscriber may be a wireless or fixed telephone, computer, server, game unit or television equipment such as an IPTV client, Set Top Box, etc. The invention is thus not limited to any particular communication equipment of the subscriber. Further, the term "relevant" service level implies that the service level is justified/warranted to the subscriber which is effectively determined by the service level indication and the operator's definition of that service level.

Figure 1:
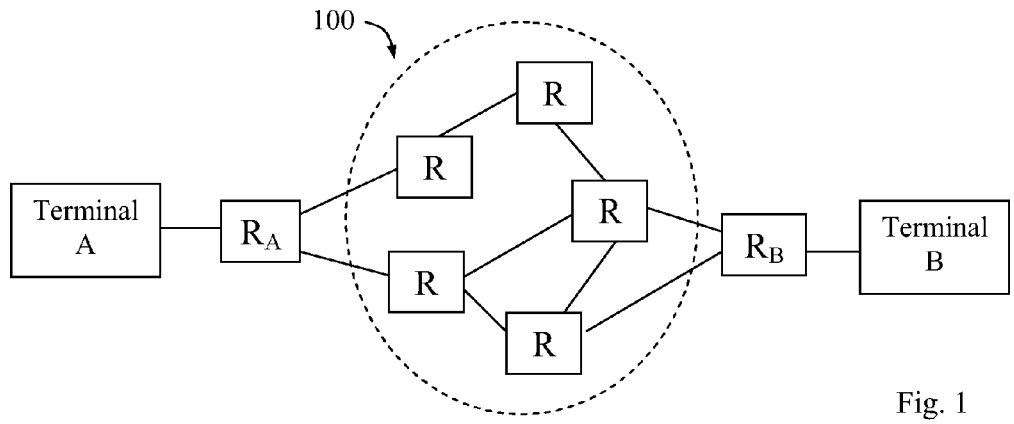
FIG. 1 illustrates a typical scenario for a peer-to-peer session between user terminals A and B over routers R in an IP network.
Figure 2:
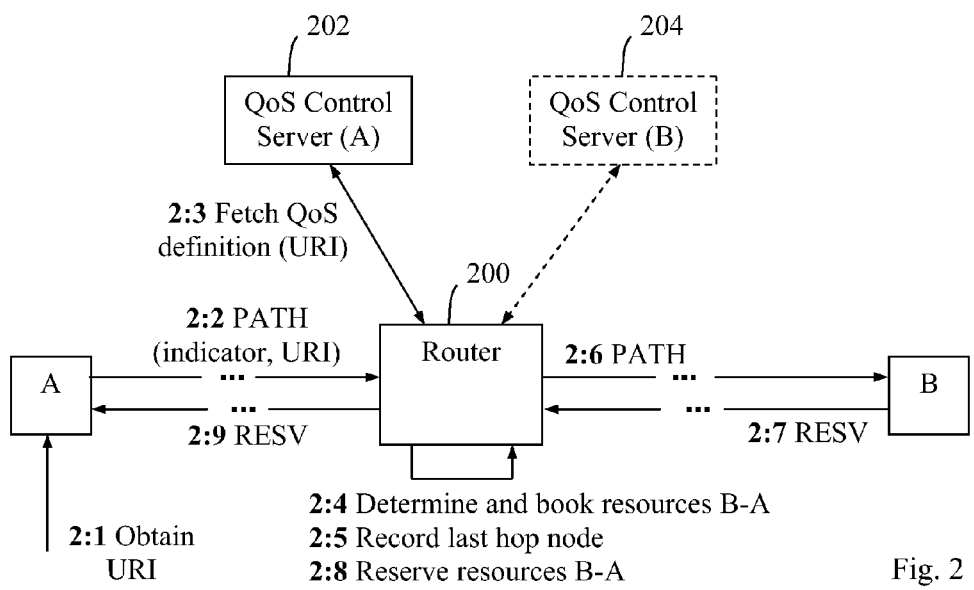
FIG. 2 is a schematic block diagram illustrating a procedure for providing a relevant service level for a subscriber A in a peer-to-peer session with a subscriber B, according to further embodiments.

A procedure for providing a relevant service level for a subscriber A in a peer-to-peer session with a subscriber B, will now be described firstly with reference to a communication scenario shown in FIG. 2. For simplicity, the figure illustrates the procedure as executed in just one exemplary router 200 located somewhere in a transmission path between A and B, although the shown procedure is basically executed in any other routers in the transmission path as well. In the figure, QoS is used synonymously for service level. It is further assumed that subscribers A and B have different service levels, thus entailing an asymmetric session in terms of service levels. Subscriber A might be a Platinum subscriber expecting a relatively high service level, while subscriber B might be a Bronze subscriber expecting a relatively lower service level.

A first step 2:1 illustrates schematically that subscriber A at some point obtains a URI leading to a QoS control server 202 where a definition of applicable service levels are stored, which definition has been determined and established by the network operator serving subscriber A. For example, the URI may be obtained from the operator's network when the terminal of subscriber A is powered on and registers with an access network. The URI could also be preconfigured in the terminal, depending on the implementation.

Before the following further steps are executed, it is assumed that a regular SDP negotiation between subscribers A and B for peer-to-peer communication has already been performed, involving the exchange of SDP messages between A and B to establish various session parameters to be used by both parties, such as codecs for media. In a next step 2:2, subscriber A sends a session setup message comprising a service level indicator indicating the relevant and required service level for subscriber A, which is received by the router 200, e.g. after the message has passed through one or more previous routers in the path. The shown router 200 could in fact be any router in the transmission path between A and B.

Thus, subscriber A has mapped its required service level, as agreed in the preceding SDP negotiation, into the session setup message sent in step 2:2. In this example, this session setup message is a resource booking message called "PATH" which can be utilised to carry the service level indicator, although the invention is generally not limited to this particular session setup message. The PATH message also contains the above-described URI pointing to the operator's service level definition in QoS control server 202. An exemplary modified PATH message will be described in more detail later below.

In a following step 2:3, the router 200 uses the received URI to fetch the service level definition from the QoS control server 202, in order to determine the significance of the received service level indicator. Alternatively, the router 200 may retrieve the service level definition from a local storage in the router if it has been stored or cached therein previously. Thus, the router 200 is now able to determine what service quality is expected and warranted for subscriber A when receiving media from B, and thereby also what communication resources are necessary to use in the router for fulfilling the relevant service level. Hence in a next step 2:4, the necessary communication resources are determined and then booked or prepared accordingly in the router 200, based on the received indicator and fetched definition, for communication of data or media in the receive direction for A, i.e. from B to A.

In addition, the router 200 also records the last hop node in a next step 2:5, i.e. a suitable identity such as the IP address of the previous router, not shown, having forwarded the message to router 200, such that any messages or data in the opposite direction can follow the same path with routers having booked or prepared resources likewise as the router 200. If router 200 is the first node in the path, the last hop node to record would be subscriber A. The PATH message is then forwarded to the next hop router, not shown, in the path towards subscriber B, as schematically shown in a step 2:6.

When subscriber B finally receives the PATH message, a response session setup message is sent from subscriber B over the transmission path in a step 2:7, to confirm the service level in B's send direction and the booked resources in the routers along the path from B to A. It should be noted that subscriber B has already agreed to the service level in B's send direction by means of the preceding SDP negotiation made before step 2:2, which also was mapped into the PATH message from A. Optionally, the terminal of subscriber B may also determine the actual service level of A based on the indicator and URI in the PATH message, i.e. basically in the same manner as the router did in step 2:4. The response session setup message will be transmitted from subscriber B in the reverse direction over the same routers as the initial session setup message from A, thanks to the recording of the last hop node in each router.

In this example, the response session setup message is a resource confirmation message called "RESV", although the invention is generally not limited to this particular response session setup message. The above-used exemplary resource booking messages PATH and RESV are configured according to the protocol RVSP (Resource Reservation Protocol) which is widely used for establishing QoS for sessions.

In a next step 2:8, upon receiving the RESV message sent from B, the router 200 reserves the booked and prepared resources for communication in the direction from B to A and then forwards the RESV message to the next hop node in the reverse direction towards A, i.e. the last hop node previously recorded in router 200, in a last shown step 2:9. In this way, resources booked and prepared in each router along the path are confirmed and reserved for the session when the RESV message is transmitted through the router path, thereby ensuring that media will be communicated with the relevant service level in all routers. Finally, the RESV message will reach subscriber A to confirm the resource reservations made in the path.

Subscriber A can now receive media from B with the relevant service level. The above-described procedure can also be conducted for making resource reservations in the routers to set up a transmission path in the opposite direction from A to B and provide a relevant service level therein for subscriber B. Thus, subscriber B will start another resource reservation procedure by sending a PATH message comprising a service level indicator valid for B and a URI pointing to a service level definition in a QoS control server 204 of an operator serving subscriber B, basically in the same way as subscriber A did.

The router 200, and other routers along the path, will then be able to fetch the operator's service level definition valid for subscriber B from QoS control server 204 and using the URI in the manner described above for A, as indicated by the dashed two-way arrow. The necessary communication resources can then be determined and reserved accordingly in each router for the receive direction of B, i.e. from A to B. In this example, subscribers A and B are served by different operators although they could also be served by the same operator and the same QoS control server.

After the necessary communication resources have been reserved in all routers along the transmission path for both directions, i.e. basically according to steps 2:2-2:9, an asymmetric session can be executed between subscribers A and B. In the case of A being a Platinum subscriber and B being a Bronze subscriber, a relevant service level of Platinum is provided for the receive direction of A and a relevant service level of Bronze is provided for the receive direction of B.

In the above example, the session setup messages used for booking, preparing and reserving required router resources according to the SDP negotiation were PATH and RESV messages, e.g. according to the RSVP protocol or the MPLS protocol. However, the invention is not limited to these particular messages and other similar session setup messages may also be used for mapping the agreed SDP negotiation parameters, e.g. according to the protocols G-MPLS Diffserv, Intserv, etc.

Figure 3:
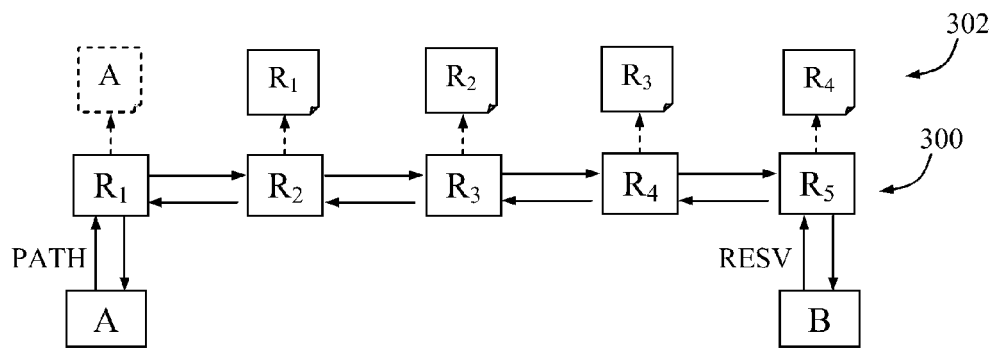
FIG. 3 is a schematic block diagram illustrating how the last hop node is recorded in each router of a transmission path between subscribers A and B when a PATH message is forwarded, according to another embodiment.

FIG. 3 illustrates an example of how each router 300 of a transmission path between subscribers A and B records 302 the last hop node when a session setup message from A, in this case the PATH message, is transmitted over the routers. Thus, the first router $R_1$ receiving the PATH message directly from A records subscriber A as the last hop node. In the same way, router $R_2$ records $R_1$, router $R_3$ records $R_2$, router $R_4$ records $R_3$, and router $R_5$ records $R_4$ as respective last hop nodes. It may not be necessary for router $R_2$ to record A, since data packets directed to A will be forwarded to A in the final hop based on a destination address of A in each packet.

Thereby, a response session setup message from B, in this case the RESV message, can be transmitted to A over the same routers in the reverse direction. Any further data packets from B to A during the session will also travel the same path based on the recorded last hop nodes. This procedure can also be executed in a corresponding manner for forthcoming data packets in the opposite direction from A to B.

A more detailed example will now be described of how SDP negotiation messages can be configured with parameters to be mapped into the above-mentioned session setup message and response session setup message, e.g. the PATH and RESV messages. Again, it is assumed that subscriber A, being a Platinum user, initiates a session with subscriber B, being a Bronze user. The exemplary session setup message from A is a SIP INVITE message with extra SIP headers, as follows:

```
m=audio 20002 RTP/AVP 0
c=IN IP4 192.0.2.1
a=curr:qos e2e none
a=des:qos mandatory e2e
scheme "http://www.QoSOperatorX.com/attributes.xml"
sendrecv platinum
```

The last parameter being the service level indicator provided by A, i.e. platinum. The parameter called "scheme" represents the service level definition of A's operator X, to be fetched from a QoS control server by means of the URI http://www.QoSOperatorX.com/attributes.xml which thus points to an XML-document in the QoS control server containing the service level definition of operator X.

The receiving subscriber B is only entitled to use the service level of Bronze, so the response session setup message from B contains a service level indicator for bronze. The exemplary response session setup message from B is a 200 OK message with extra SIP headers, as follows:

```
m=audio 30000 RTP/AVP 0
c=IN IP4 192.0.2.4
a=curr:qos e2e none
a=des:qos mandatory e2e
scheme "http://www.QoSOperatorY.com/attributes.xml"
sendrecv bronze
a=conf:qos e2e recv
```

The URI http://www.QoSOperatorY.com/attributes.xml points to an XML-document in a QoS control server containing the service level definition of B's operator Y. In both these messages, the second a-line thus contains the necessary parameters to resolve the desired service level in both directions, including service level indicator and URI. This a-line in either message can be interpreted by both subscribers in order to determine the accurate service level for either direction. In this case, subscriber A will interpret:
scheme=QoSOpeatorX
level=sendrecv platinum
and subscriber B will interpret:
scheme=QoSOpeatorY
level=sendrecv bronze These service level indicators can thus be interpreted and translated into necessary or required session parameters according to the respective service level definitions in the XML-documents which can be either cached at the subscribers or fetched from the provided URI.

For example, necessary communication parameters for upload/download transmission can be provided in each XML document. Furthermore, the XML document may be verified against an XML schema found at the same URI, which basically contains rules for that XML document, in order to prevent fraudulent behaviour of the clients. This can be done anywhere in the resource reservation path.

Once the necessary communication parameters have been resolved, the SDP may contain uplink/downlink parameters, if the subscribers use wireless terminals, and possibly additional parameters such as latency etc., which can be acknowledged by both ends. The initiating subscriber A will then map these parameters to the resource reservation protocol currently used, e.g. RVSP as in the above examples.

In each intermediate node or router, the necessary communication resources are reserved for the forthcoming session in response to the PATH messages from subscribers A and B, as described above, resulting in a "path state" being created in each router for data packets in each transport direction, i.e. the respective receive directions of A and B. These communication resources may include:

1. sender template to describe the format of the sender data.
2. sender tspec to describe the traffic characteristics or bandwidth of the data flow.
3. adspec that carries advertising data [XX]

When the RESV message is sent along the reverse data path, the IP destination address of the RESV message is changed at each node to the address of the next node on the reverse path, i.e. the last hop node recorded in the forward path, and the IP source address is also changed to the IP address of the previous node on the reverse path. The RESV message may further include a so-called "flowspec data object" that identifies the resources needed for the session.

Hence, subscriber A firstly sends the PATH message populated with the agreed parameters from the preceding SDP negotiation. Subscriber B then acknowledges the PATH message with the RESV message using the same parameters, which can be acknowledged against the SDP. In any node along the path, the QoS parameters can be acknowledged against the XML document found in the URI in the respective session setup message. Once the RESV message is acknowledged, the actual session can be started.

Figure 4:
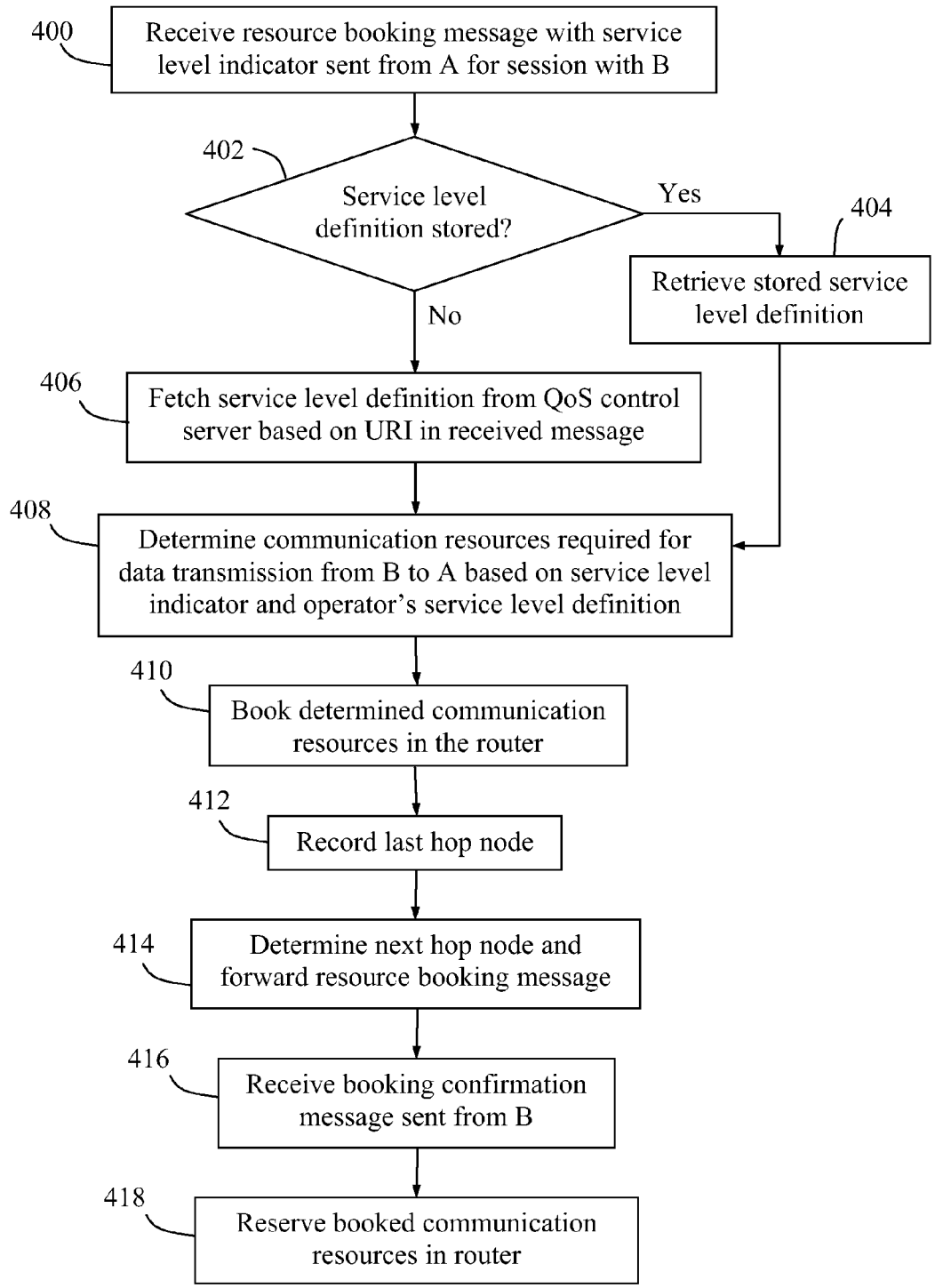
FIG. 4 is a flow chart illustrating a procedure for providing a relevant service level in a router in a transmission path between subscribers A and B, according to yet another embodiment.

An exemplary procedure in a router of an IP network, for providing a relevant service level for a first subscriber A in a peer-to-peer session with a second subscriber B, will now be described with reference to the flow chart in FIG. 4. In a first step 400, a session setup message sent from subscriber A for the session with subscriber B is received at the router, the session setup message in this case being a resource booking message such as the PATH message. The received resource booking message comprises a service level indicator and optionally also a URI referring to a service level definition of subscriber A's operator that can be fetched from a QoS control server as described above.

In a next step 402, it is checked whether the service level definition has been stored locally in the router previously. In that case, the stored service level definition is retrieved from a local storage or the like, in a step 404. If no such definition is locally stored, the operator's service level definition is fetched from a QoS control server or the like, based on the URI in the received resource booking message, in a further step 406.

In a following step 408, having obtained the proper service level definition, the router can now determine what communication resources are required in the router, based on the received service level indicator and obtained service level definition, for data transmission from B to A ensuring a relevant service level for the receiving subscriber A. The determined communication resources are also booked and prepared in a next step 410.

In a further step 412, the router records the last hop node, i.e. the previous node having forwarded the message to the present router. Thereby, any messages or data in the opposite direction can follow the same path over routers having booked and prepared resources in the same manner. This step may include recording an IP address or other suitable identity of the last hop node. The next hop router in the path towards subscriber B is then determined, and the resource booking message is forwarded thereto, in a next step 414. A regular forwarding mechanism may be used in this step.

In due course, the resource booking message sent from subscriber A will arrive at subscriber B, which then responds by sending a booking confirmation message back to subscriber A, e.g. the RESV message, as a response session setup message. This response message can then be routed according to the last hop nodes recorded in each router of the transmission path, as described above. Thus, the booking response message is received at the present router in a step 416. Since this message is effectively a confirmation that the opposite subscriber accepts the proposed session, the previously booked and prepared communication resources can finally be reserved for the forthcoming session, in a final step 418.

As mentioned above, this procedure is basically executed in each router along the transmission path, preferably in both directions. When the session has been prepared in this way the proper session can commence, each router ensuring by means of the reserved communication resources, that the subscribers will receive data with relevant service levels.

Figure 5:
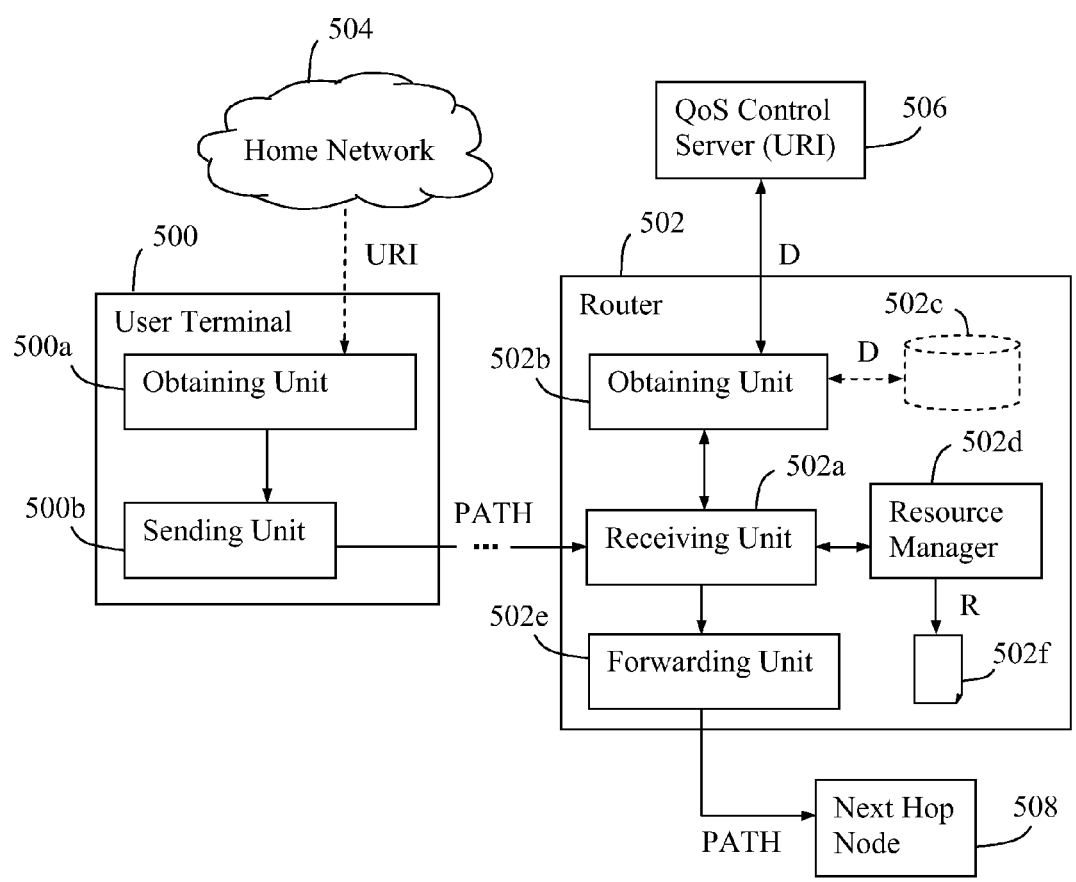
FIG. 5 is a schematic block diagram illustrating in more detail arrangements in a user terminal 500 and a router 502, according to further embodiments.

FIG. 5 is a block diagram illustrating in more detail an arrangement in a user terminal 500 of a first subscriber and an arrangement in a router 502 of an IP network, capable of providing a relevant service level for at least the first subscriber in a peer-to-peer session with a second subscriber, not shown. The user terminal 500 may be, without limitation, a wireless or fixed telephone, computer, server, game unit or television equipment such as an IPTV client or Set Top Box, etc.

The user terminal 500 comprises an obtaining unit 500a adapted to obtain a URI, e.g. from its home network 504, the URI referring to a service level definition D maintained by a QoS control server 506 of an operator of the first subscriber. The user terminal 500 also comprises a sending unit 500b adapted to send a session setup message, in this example a PATH message, towards the second subscriber over a transmission path comprising the router 502. The sent PATH message comprises the obtained URI and a service level indicator referring to a required service level of the first subscriber.

As shown in the figure, a receiving unit 502a in the router 502 is adapted to receive the PATH message sent from terminal 500. The receiving unit 502a is also adapted to detect a required service level of the first subscriber from the service level indicator included in the received session setup message. The router 502 further comprises an obtaining unit 502b adapted to obtain a service level definition D of an operator of the first subscriber, either from a QoS control server 506 or from a local storage 502c in the router if the URI has been stored or cached therein previously.

The router 502 further comprises a resource manager 502d adapted to determine communication resources required in the router for data transmission from the second subscriber to the first subscriber according to the detected service level of the first subscriber as interpreted by means of the obtained service level definition. The resource manager 502d is further adapted to reserve the above determined communication resources in the router. The router 502 also comprises a forwarding unit 502e adapted to forward the session setup message to a next hop node 508, typically a next router in the transmission path where a similar procedure is conducted.

The resource manager 502d may be further adapted to record a last hop node, not shown, which has forwarded the PATH message to the router, in another local storage 502f in the router 502. The recorded last hop node can later be used to ensure that any session-related messages and data packets transmitted in the opposite direction are routed over the same path as the PATH message, i.e. over routers having reserved communication resources in the same way.

It should be noted that FIG. 5 merely illustrates various functional units in the user terminal 500 and the router 502 in a logical sense. However, the skilled person is free to implement these functions in practice using any suitable software and hardware means. Thus, the invention is generally not limited to the shown structure of the terminal 500 and router 502.

By using any of the above-described embodiments, peer-to-peer sessions can be established between subscribers over routers in a transmission path of an IP network in a way that provides for relevant service levels for the participating subscribers. If the above-described mechanism is applied for both directions of a session, communication resources can be reserved asymmetrically in the routers according to different service levels that are expected or required by the subscribers. Thereby, both subscribers will be able to receive data during the session according to their respective relevant service levels.

While the invention has been described with reference to specific exemplary embodiments, the description is in general only intended to illustrate the inventive concept and should not be taken as limiting the scope of the invention. For example, the protocols SIP, and the messages PATH and RESV of the RSVP protocol have been used here when describing the above embodiments, although any other standards and protocols with the functions above may basically be used. The invention is defined by the appended claims.

The invention claimed is:

1. A method in a router of an IP network for providing a relevant service level for a first subscriber in a peer-to-peer session with a second subscriber, comprising:
  receiving a session setup message sent from the first subscriber for setting up the peer-to-peer session between the first subscriber and the second subscriber,
  detecting, from a service level indicator included in the session setup message, a service level with which the first subscriber's subscription with the first subscriber's operator entitles the first subscriber to set up the peer-to-peer session,
  obtaining a service level definition of the operator of the first subscriber,
  interpreting the detected service level of the first subscriber via said service level definition,
  determining communication resources required in the router for data transmission from the second subscriber to the first subscriber via the peer-to-peer session based on said interpreting,
  booking said communication resources in the router, and
  forwarding the session setup message to a next hop node.

2. The method according to claim 1, further comprising recording in the router a last hop node that forwarded said session setup message to the router, for further use to ensure that any session-related messages and data packets transmitted in an opposite direction are routed over the same path as said session setup message.

3. The method according to claim 1, wherein the session setup message comprises parameters mapped from a preceding Session Description Protocol (SDP) negotiation.

4. The method according to claim 1, wherein the session setup message from the first subscriber is a resource booking message, and wherein the method further comprises reserving said booked communication resources in the router upon receiving a booking confirmation message sent from the second subscriber.

5. The method according to claim 4, wherein the resource booking message is a PATH message and the booking confirmation message is a RESV message according to the Resource Reservation Protocol (RSVP).

6. The method according to claim 1, wherein obtaining said service level definition comprises fetching said service level definition from a Quality of Service (QoS) control server of said operator of the first subscriber, based on a Uniform Resource Identifier (URI) in the received session setup message.

7. The method according to claim 6, wherein the service level definition is specified in an XML document maintained at the QoS control server.

8. The method according to claim 1, wherein obtaining said service level definition comprises retrieving said service level definition from a local storage in the router.

9. The method of claim 1, wherein the service level definition is specific to the first subscriber's operator and defines the service level in terms of one or more quality-related session parameters required to achieve that service level.

10. The method of claim 1, wherein said interpreting comprises interpreting the detected service level via the service level definition as one or more quality-related session parameters required to achieve that service level and wherein said determining comprises determining said communication resources in the router from said one or more quality-related session parameters.

11. A router of an IP network configured to provide a relevant service level for a first subscriber in a peer-to-peer session with a second subscriber, comprising:
  a receiving circuit configured to receive a session setup message sent from the first subscriber for setting up the peer-to-peer session with the second subscriber, and to detect, from a service level indicator included in the session setup message, a service level with which the first subscriber's subscription with the first subscriber's operator entitles the first subscriber to set up the peer-to-peer session,
  an obtaining circuit configured to obtain a service level definition of the operator of the first subscriber,
  a resource manager circuit configured to:
    interpret the detected service level of the first subscriber via said service level definition,
    determine communication resources required in the router for data transmission from the second subscriber to the first subscriber via the peer-to-peer session based on said interpreting,
    book said communication resources in the router, and
  a forwarding circuit configured to forward the session setup message to a next hop node.

12. The router according to claim 11, wherein the resource manager circuit is further configured to record in the router a last hop node that forwarded said session setup message to the router, for further use to ensure that any session-related messages and data packets transmitted in an opposite direction are routed over the same path as said session setup message.

13. The router according to claim 11, wherein the session setup message comprises parameters mapped from a preceding Session Description Protocol (SDP) negotiation.

14. The router according to claim 11, wherein the session setup message from the first subscriber is a resource booking message, and wherein the resource manager circuit is further configured to reserve said booked communication resources in the router upon receiving a booking confirmation message sent from the second subscriber.

15. The router according to claim 14, wherein the resource booking message is a PATH message and the booking confirmation message is a RESV message according to the Resource Reservation Protocol (RSVP).

16. The router according to claim 11, wherein the obtaining circuit is further configured to fetch said service level definition from a Quality of Service (QoS) control server of said operator of the first subscriber, based on a Uniform Resource Identifier (URI) in the received session setup message.

17. The router according to claim 16, wherein the service level definition is specified in an XML document maintained at the QoS control server.

18. The router according to claim 11, wherein the obtaining circuit is further configured to retrieve said service level definition from a local storage in the router.

19. The router of claim 11, wherein the resource manager circuit is configured to interpret the detected service level via the service level definition as one or more quality-related session parameters required to achieve that service level and determine said communication resources in the router from said one or more quality-related session parameters.

20. A user terminal of a first subscriber configured to obtain a relevant service level in a peer-to-peer session with a second subscriber, comprising:
  an obtaining circuit configured to obtain a Uniform Resource Identifier (URI) referring to a service level definition maintained by a Quality of Service (QoS) control server of an operator of the first subscriber, and a sending circuit configured to send a session setup message to the second subscriber over a transmission path comprising at least one router, said session setup message comprising said URI and a service level indicator referring to a service level with which the first subscriber's subscription with the first subscriber's operator entitles the first subscriber to set up the peer-to-peer session.

* * * * *

UNITED STATES PATENT AND TRADEMARK OFFICE
CERTIFICATE OF CORRECTION

PATENT NO.        : 9,277,029 B2                             Page 1 of 1
APPLICATION NO.   : 13/260538
DATED             : March 1, 2016
INVENTOR(S)       : Lidström et al.

It is certified that error appears in the above-identified patent and that said Letters Patent is hereby corrected as shown below:

On the Title Page, in item (75), under "Inventors", in Column 1, Line 1, delete "Stockolm (SE);" and insert -- Stockholm (SE); --, therefor.

Signed and Sealed this
Twenty-first Day of June, 2016

Michelle K. Lee
*Director of the United States Patent and Trademark Office*